Nov. 3, 1964 TARO YOSHIDA 3,155,947

FLIP-FLOP CIRCUIT

Filed Nov. 29, 1960

PRIOR ART

United States Patent Office 3,155,947

Patented Nov. 3, 1964

3,155,947

FLIP-FLOP CIRCUIT

Taro Yoshida, Nagoya, Japan, assignor to Mitsubishi Denki Kabushiki Kaisha, Tokyo, Japan, a company of Japan Filed Nov. 29, 1960, Ser. No. 72,340
Claims priority, application Japan Dec. 7, 1959
6 Claims. (Cl. 340—174)

The present invention relates generally to flip-flop circuits and more particularly relates to a transistorized flip-flop circuit which may accurately be restored to the output state memorized prior to removal and reconnection of sources of power to the flip-flop circuit.

Upon removal or loss and reconnection of the bias power supplies to a transistorized flip-flop circuit of the prior art, the output state of the circuit prior to loss of power may be lost. Conventional flip-flop circuits provide no assurance that the switching devices used will be restored to their conductive state held at the time the bias power supplies are disconnected. It is readily apparent that loss of the prior history of the flip-flop circuit upon reconnection of the power can result in improper operation of controlled apparatus.

An object of the present invention is to provide a flip-flop circuit which may accurately be restored to the memorized state before the stoppage of electricity when the trouble is removed and the line is revived.

Another object of the present invention is to provide a flip-flop circuit capable of returning its switching devices to their conductive state held at the time power was disconnected.

Another object of the present invention is to provide such a new and improved flip-flop circuit wherein the tolerances of the circuit parameters may vary without affecting critical operation of the circuit thereby allowing less expensive circuit elements.

Further objects and advantages of the present invention will be readily apparent from the followed detailed description taken in conjunction with the drawings, in which.

Figure 1:
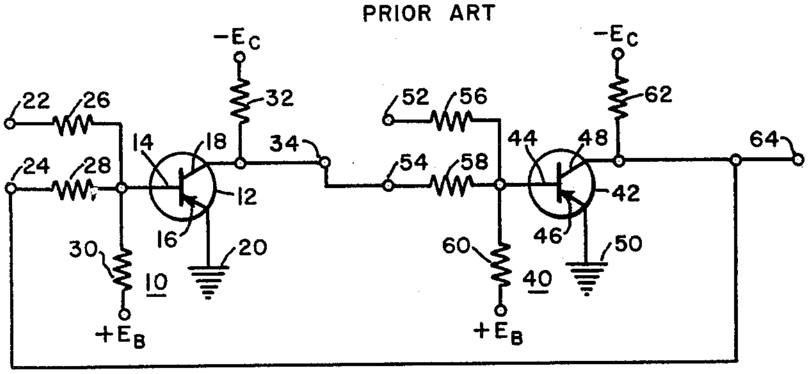
FIGURE 1 is a schematic diagram of an illustrative embodiment constructed of the prior art.

FIGURE 1, in accordance with the prior art, illustrates two NOR elements 10 and 40 appropriately connected to form a flip-flop or memory element. NOR element 10 comprises a semiconductor switching device for transistor 12 of suitable type herein shown as an PNP type. The transistor 12 has a base electrode 14, an emitter electrode 16 and a collector electrode 18. The emitter electrode 16 is shown connected to ground potential indicated at 20. The base electrode 14 is connected to two input terminals 22 and 24 through their respective isolating impedances 26 and 28. A biasing resistor 30 connects the base electrode 14 to a positive potential bias power supply $E_B$ while a current limiting resistor 32 connects the collector electrode 18 to a source of negative power bias supply $E_C$. The collector electrode 18 is also connected to an output terminal 34.

The NOR element 40 comprises a static switching element or transistor 42 of suitable type herein shown as a PNP type. The transistor 42 has a base electrode 44, an emitter electrode 46 and a collector electrode 48. The emitter electrode 46 is shown connected to ground potential indicated at 50. The base electrode 44 is connected to two input terminals 52 and 54 through their respective isolating impedances 56 and 58. A biasing resistor 60 connects the base electrode 44 to a positive source of biasing potential $E_B$ while a current limiting resistor 62 connects the collector electrode 48 to a negative source of negative bias power supply $E_C$. The collector electrode 48 is also connected to an output terminal 64.

If no signal is present at the input terminals of the NOR element, its associated transistor is non-conductive and an output will appear at its output terminal which will be approximately the value of the potential of the negative power supply $E_C$. If a negative potential signal is applied to one or more of the input terminals, the transistor becomes highly conductive, simulating a switch in the closed position, and effectively grounding the output terminal so that there will be no output from the NOR element.

The flip-flop or memory element, is constructed by the cross connection of the outputs and inputs of the two NOR elements 10 and 40. The output of the NOR element 10 is connected to the input terminal 54 of the NOR element 40. The output of the NOR element 40 is connected to the input terminal 24 of the NOR element 10.

The input terminal 22 has been designated at the set input terminal for the flip-flop circuit in that a proper input signal will result in a predetermined output state by the flip-flop circuit, namely, the voltage $E_C$ appearing at the output terminal 64. The input terminal 52 has been designated as the reset input terminal wherein a proper input signal applied thereto will reset the flip-flop circuit to its original state designated as the state wherein no output voltage appears at the terminal 64 since the transistor 42 is in its conductive state thereby grounding the negative power supply $E_C$.

Upon removal or loss of the bias power supply to the flip-flop circuit the output state of the flip-flop circuit at the time of such loss is lost. Reconnection of the bias power supplies may result in either transistor being rendered conductive regardless of the conductive state of the transistors prior to the removal or loss of the bias power supplies. Upon reconnection, the NOR element having the lesser impedance will be first rendered conductive as the result of a phenomenon likened unto a race wherein the transistor which first becomes conductive in point of time will ground the output of its associated NOR element and hence provide no input signal to the input terminal connected thereto. Thus, the conductive states of the semiconductor switching elements or devices is not determined by their state prior to removal or loss of the bias power supplies but rather by the tolerances and the variances of each individual parameter and the total thereof comprising each NOR element.

Figure 2:
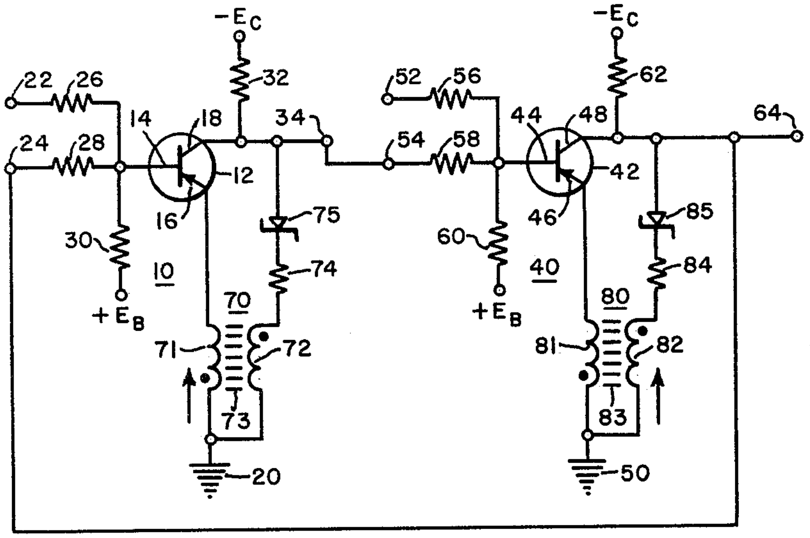
FIG. 2 is a schematic diagram of an illustrative embodiment of the present invention.

The flip-flop circuit in accordance with the present invention is shown in FIGURE 2 wherein like elements have been designated with the same reference characters used in FIGURE 1.

A first saturable reactor means 70 is operatively connected in the NOR element 10 and a second saturable reactor means 80 is operatively connected in the NOR element 40.

The saturable reactor means 70 more particularly comprises a primary winding 71 and a secondary winding 72 inductively disposed on a saturable core 73. The primary winding 71 connects the emitter electrode 16 to ground 20. The secondary winding 72 is connected in series circuit relationship with an impedance 74 and Zener diode 75 which series circuit relationship connects the collector electrode 18 to ground 20.

The saturable reactor means 80 more particularly comprises a primary winding 81 and a secondary winding 82 inductively disposed on a magnetic core 83. The primary winding 81 connects the emitter electrode 46 to ground 50. The secondary winding 82 connected in series circuit relationship with an impedance element 84 and Zener diode 85 all connects the collector electrode 48 to ground 50.

The windings of the saturable reactor means 70 and 80 have been wound on the magnetic core members in a manner denoted by the polarity dot convention. That is, current flowing into the polarity dot end of a winding will drive the inductively associated core towards positive saturation. Current flowing out of the polarity dot end of the winding will drive the inductively associated core away from positive saturation.

Figure 3:
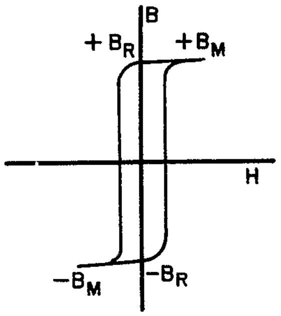
FIG. 3 is a graphical representation of the characteristics of a device shown in FIGURE 2.

The saturable reactor means 70 and 80 are chosen to have a ratio of residual flux density $B_R$ to the maximum or saturation flux density $B_M$ as close to unity as possible. FIGURE 3 illustrates a flux density characteristic curve of such a saturable core. Current flowing into the polarity dot end of a winding associated with the saturable reactor means will drive the inductively associated core towards positive saturation designated in the conventional manner as positive saturation flux density, $+B_M$. Current flowing out of the polarity dot end of a winding associated with the inductively associated core will drive the inductively associated core towards negative saturation designated as the negative saturation flux density, $-B_M$. Upon removal of excitation to the core it will return to a residual flux density $B_R$ as determined by its sense of saturation prior to removal of the biasing source.

Referring to FIGURE 2 the arrows indicate the direction of current when transistor 12 is in its conductive state and transistor 42 is in its non-conductive state. The output state of the flip-flop circuit at terminal 64 is then a voltage substantially equal to the bias supply voltage $-E_C$. Saturable reactor means 70 assumes a positive saturation flux density $+B_M$ and saturable reactor means 80 assumes a negative saturation flux density $-B_M$. When power sources $+E_B$ and $-E_C$ are disconnected, the saturable reactor cores 73 and 83 are shifted from positive saturation flux density $+B_M$ to positive residual flux density, $+B_R$, and from negative saturation flux density, $-B_M$, to negative residual flux density, $-B_R$, respectively.

When the power sources $+E_B$ and $-E_C$ are connected once more, current tends to flow from the emitter electrode to the collector electrode in both transistors 12 and 42. The saturable reactor cores 73 and 83 are excited in such a way that they may be shifted to either point $+B_M$ or point $-B_M$ whichever having lower impedance since the values of impedance of the saturable reactor means 70 and 80 are markedly different from each other depending on the direction of current through its associated windings. In the NOR element 10 the saturable reactor core 73 is easily saturated to allow current flow therethrough since the core 73 is driven from positive residual flux density, $+B_R$, to positive saturation flux density, $+B_M$.

The saturable reactor core 83 being in a negative saturation flux density state $-B_R$ absorbs voltage, i.e. a major portion of the voltage appears across the reactor, thereby preventing the increase of emitter current in its associated transistor 42 and hence keeps it non-conductive. Consequently, transistor 12 returns to its conductive state and transistor 42 returns to its non-conductive state. The series circuit including the secondary winding 82 connecting the collector electrode 48 to ground 50 is substantially in an open position due to the Zener diode 85.

It is to be understood that a Zener diode is a semiconductor rectifier, usually a silicon diode, which has the characteristic of blocking current flow in one direction when the voltage is below a predetermined breakover value while current is permitted to flow freely when the voltage is above a predetermined value. The breakover is non-destructive so that the current is cut off when the voltage again drops below the breakover value. Of course, any device with a breakover region as described can be used.

When the voltage at the output terminal 64 has gone negative enough in magnitude to exceed the predetermined breakover level of the Zener diode 85, the Zener diode 85 becomes conductive, allowing current through the secondary winding 82. Then the flux density of the saturable magnetic core 83 is driven to the negative saturation flux density point, $-B_M$ thereby restoring the transistors and the saturable reactor means to the state held prior to interruption of the power supplies.

Thus, it is readily apparent that the present invention has provided a new and improved flip-flop circuit capable of being accurately restored to the output state held at the time of stoppage or disconnection of the bias power supplies $+E_B$ and $-E_C$. Should the conductive states of the transistors 12 and 42 be non-conductive and conductive, respectively, upon loss of the power supplies, then the saturable reactor means 70 and 80 function as the other did when at that conductive state upon removal or loss and reconnection of the power supplies.

While the present invention has been described with a particular degree of exactness for the purpose of illustration, it is to be understood that all alterations, equivalents and modifications within the spirit and scope of the present invention are herein meant to be included. The transistors have been illustrated to be of the PNP type but NPN transistors may be used with suitable changes in polarity.

I claim as my invention:

1. A circuit comprising first and second semiconductor switching devices cross-coupled to form a flip-flop, each device including at least a base electrode, a collector electrode, and an emitter electrode; first and second saturable reactor means respectively connected to said first and second switching devices; each saturable means including a magnetic core having a primary winding and a secondary winding inductvely disposed thereon; set input means connected to the base electrode to said first semiconductor switching device; reset input means connected to the base electrode of said second semiconductor switching device; each primary winding connecting the emitter electrode of its associated semiconductor switching device to ground; Zener diode means for each saturable means connected in series circuit relationship with its associated secondary winding across the collector electrode of its associated semiconductor device and ground; said primary windings disposed to drive their associated magnetic cores toward saturation of a predetermined polarity; said secondary windings disposed to drive their associated magnetic cores toward saturation of opposite polarity; said magnetic cores assuming a saturation state polarity in accordance with the conductive state of its associated semiconductor switching device; disconnection and reconnection of said bias supply means resulting in the semiconductor switching device associated with the saturable reactor of a predetermined polarity being returned to its conductive state existing prior to removal of said biasing supply means, the other saturable reactor of opposite saturation polarity being driven in the direction of said opposite polarity saturation upon the voltage across said series circuit relationship exceeding a predetermined breakover value of said associated Zener diode means.

2. A circuit comprising first and second semiconductor switching devices cross-coupled to form a flip-flop, each device having first and second electrodes and an internal power current path extending from one to the other of the first and second electrodes, each said device having associated therewith a first circuit extending between said first electrode and ground and including in series said internal power path and a second circuit connecting the second electrode to ground; biasing means for said switching devices; a saturable reactor for each device operatively connected thereto and assuming a saturation flux density of polarity in accordance with the conductive state of its associated static switching device; upon disconnection of said biasing means each said saturable reactor assuming an impedance value in accordance with the conductive state of the associated static switching device prior to removal of said biasing means; said saturable reactor of lower impedance being the first to saturate upon reconnection of said biasing means thereby forcing its associated static switching device to its conductive state existing prior to disconnection of said biasing means; voltage reference means operatively connected to each saturable reactor for allowing current flow through the saturable reactor of the higher impedance when the voltage at said first electrode with respect to ground exceeds a predetermined voltage set by said voltage reference means so that the higher impedance reactor is driven to the saturation state opposite to that assumed by said lower impedance saturable reactor.

3. A circuit comprising first and second semiconductor switching devices cross-coupled to form a flip-flop, each device having respective emitter and collector electrodes; biasing means operatively connected to said switching devices; saturable reactor means for each switching device operatively connected to provide an impedance to emitter current in accordance with the conductive state of said switching device; said saturable reactor means assuming a residual flux density of a sense determined by the conductive state of said devices prior to removal of said biasing means; upon reconnection of said biasing means said saturable reactor means of lower impedance allowing substantially more emitter current through its associated switching device than the other saturable reactor means thereby returning its associated switching device to the conductive state existing prior to removal of said biasing means; the impedance of said second saturable reactor means being sufficiently greater to substantially prevent emitter current to its associated semiconductor switching device; reference voltage means operatively connected to each said saturable reactor means to allow current flow through the saturable reactor means of higher impedance when the collector voltage of the switching device associated with that reactor means exceeds a predetermined value set by said voltage reference means, thereby driving the saturable reactor means of the higher impedance to the impedance level held prior to removal of said biasing means.

4. An electrical circuit comprising a pair of static switching devices cross-coupled with each other to define a flip-flop, each device having first and second electrodes and an internal power current path extending from one to the other of said electrodes, each device being operable to first and second conduction states, the flip-flop having one stable state when one device is in its first conduction state and the other device is in its second conduction state, and a second stable state when the conduction states of the devices are reversed, first and second saturable reactors, each having a saturable core and respective primary and secondary windings on the core, bias means, first and second sets of circuits connected across said bias means, each set including first and second parallel circuit branches, each first branch of a set including in series the internal power current path of a different one of said devices and the primary winding of a different one of said reactors, each second branch of a set including in series a voltage reference and the secondary winding of the reactor whose primary winding is in the first branch of the same set, the voltage across each second branch being in excess of a predetermined value set by said voltage reference in response to the associated switching device being in its first state of conduction, the primary winding of each reactor being poled to drive its associated core toward a saturation flux density of a predetermined sense in response to its associated switching device being in its second conduction state, whereby upon removal of said bias means the core retains a flux density of said predetermined sense, the secondary winding of each reactor being poled to drive its associated core to a saturation flux density of opposite sense in response to the voltage across its associated second branch exceeding said predetermined value, whereby in response to the removal of said bias means the core retains a flux density of said opposite sense.

5. The combination as in claim 4 wherein said switching devices are semiconductor devices.

6. The combination as in claim 4 wherein each said voltage reference is a Zener diode.

References Cited in the file of this patent

UNITED STATES PATENTS

| | | |
|---|---|---|
| 2,939,115 | Bobeck | May 31, 1960 |
| 2,995,735 | Frank | Aug. 8, 1961 |